(No Model.)
H. M. FISK.
HEEL SUPPORT FOR RUBBERS.
No. 367,033. Patented July 26, 1887.
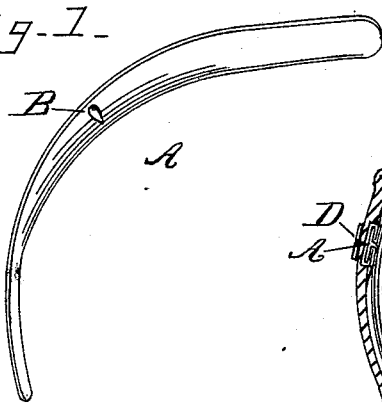
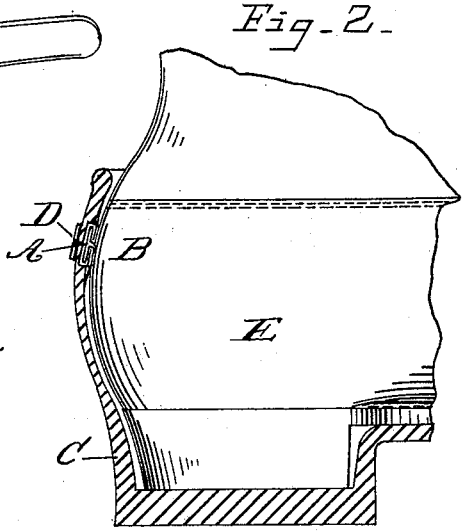
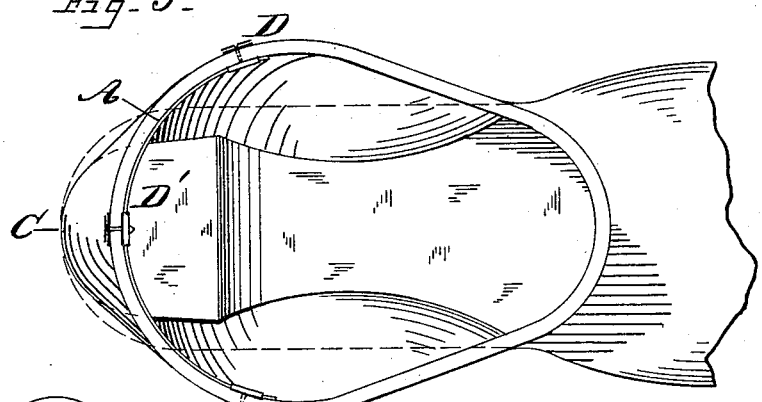
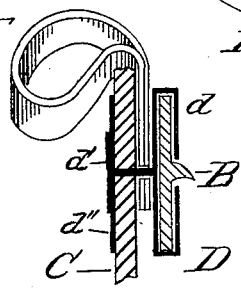
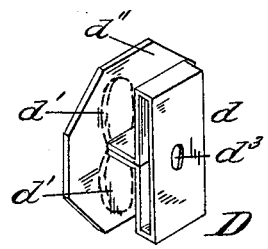
Witnesses
John M. Stright
Edwin L. Yewell.
Inventor
Harris M. Fisk
By his Attorneys
Whittlesey & Wright

UNITED STATES PATENT OFFICE.

HARRIS M. FISK, OF TOPEKA, KANSAS.

HEEL-SUPPORT FOR RUBBERS.

SPECIFICATION forming part of Letters Patent No. 367,033, dated July 26, 1887.

Application filed October 6, 1886. Serial No. 215,424. (No model.)

*To all whom it may concern:*

Be it known that I, HARRIS M. FISK, a citizen of the United States, residing at Topeka, in the county of Shawnee and State of Kansas, have invented a new and useful Improvement in Heel-Supporters for Rubbers, of which the following is a full, clear, and exact description.

My invention relates to overshoes, especially those made of rubber, and its main object is to support the rear part of the rubber in order to hold it tightly to the shoe, and prevent not only its tendency to come off when worn in stiff mud, but its liability to work up and down on the heel of the shoe, which wrinkles and cracks the rubber and soon renders it unserviceable. Other advantages incidentally follow from the use of my improved heel-supporter, as hereinafter set forth.

My invention consists of a spring provided with a sharp spur or brad, the spring being inserted in the heel of the rubber, so that when the foot of the wearer is thrust into the rubber the spur is forced into the counter of the boot or shoe and secures the rubber in place.

In the accompanying drawings, in which like letters refer to like parts in all the views, Figure 1 is a perspective view of the spring and its spur. Fig. 2 represents the rear portion of a rubber and shoe, the rubber being in section. Fig. 3 is a plan view of part of a rubber, showing how the upper part is normally held open by the spring. Figs. 4 and 5 are enlarged detail views of the fasteners.

A is a spring of brass, steel, or any suitable material. It may be of any desired cross-section, such as round, half-round, or flat, though preferably the latter, as shown. At about its center is riveted a small sharp spur, B, which is preferably inclined downward, as shown.

In applying this spring to the rubber C it is placed inside the rear end of the rubber, at or near the upper edge of the same, and preferably between the body of the rubber and the lining, with the spur B about in the center, as shown in Fig. 3. The spring may be fastened in place in any suitable way—as, for instance, by stitching, by staples, by eyelets, or by rivets; but I prefer to accomplish this by the fasteners D D', which consist of a strip of sheet metal bent into the shape shown in Figs. 4 and 5, so as to provide a flat eye, $d$, for the reception of the spring A. The ends $d'$ $d'$ are passed through the rubber and through the opening in the washer $d''$, and are flattened down upon the latter. Three of these fasteners are used, one at each end and one in the middle of the spring, the latter, D', having a hole, $d^3$, to fit over and around the spur B, thus preventing the spring from slipping out of place. The fasteners D D' at the ends of the spring may simply embrace it, leaving the ends free to slip back and forth.

The normal curvature of the spring does not correspond with the normal curve of the heel of the rubber, being of greater radius, so that the upper part of the rubber is held open and distended, as shown in Fig. 3. The purpose of this construction is twofold. It facilitates the insertion of the foot into the rubber, and it insures a pressure upon the spur B to force it into the shoe E. When the rubber is put on, its upper edge assumes the shape indicated in dotted lines in Fig. 3, the ends of the spring being drawn toward each other; but as they constantly tend to separate, and can only do so by pulling forward the back part of the rubber where the spur B is located, it follows that the spur will be constantly pressed against the shoe E. As the spur is inclined downward, it offers little or no resistance to the entrance of the shoe, but is only bedded more securely in the shoe by any movement tending to draw the shoe out of the rubber. The heel of the rubber is thus held up snugly to the shoe, which prevents the former from slipping up and down and obviates the danger of wrinkling and cracking the rubber. This increases the value of the rubber, since it enables it to last longer before wearing out. Furthermore, as the rubber is securely held from coming off, even in stiff mud, a larger rubber can be worn, which facilitates putting it on, and makes walking in rubbers more easy and agreeable. The spur is so small as not to injure the finest shoe, and yet by reason of the pressure continually exerted upon it, it is sure to accomplish the purpose for which it is intended.

In Fig. 4 I have shown how the central fastener, D', may be utilized to secure to the rubber a strap or loop, F, to assist in pulling it on.

It may be found desirable at times to use more than one spur B, but ordinarily one will prove to be quite sufficient, although for ladies' fine shoes several small teeth may be found preferable to avoid injuring the leather.

Having thus described my invention, what I claim, and desire to secure by Letters Patent, is—

1. A heel supporter for rubbers, consisting of a spring, A, having a spur, B, in combination with the fastener D, substantially as and for the purpose set forth.

2. The combination, with rubber C and the spring A, having spur B, of the fasteners D D', embracing the spring A and entering the rubber C, the fastener D' having a hole, $d'''$, for the spur B, substantially as and for the purpose set forth.

3. The combination, with a rubber, C, of spring A, having spur B, fastener D', and loop F, substantially as and for the purpose set forth.

HARRIS M. FISK.

Witnesses:
J. W. GLEED,
W. E. CURRY.